United States Patent
Nishiyabu et al.

(10) Patent No.: US 11,926,391 B2
(45) Date of Patent: Mar. 12, 2024

(54) GEARED MOTOR FOR VEHICLE

(71) Applicant: KAWASAKI MOTORS, LTD., Akashi (JP)

(72) Inventors: Masaki Nishiyabu, Akashi (JP); Takuya Noami, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/859,384

(22) Filed: Jul. 7, 2022

(65) Prior Publication Data

US 2023/0009154 A1 Jan. 12, 2023

(30) Foreign Application Priority Data

Jul. 8, 2021 (JP) .................................. 2021-113531

(51) Int. Cl.
 *B62M 11/06* (2006.01)
 *B62M 7/04* (2006.01)
 *F16H 57/021* (2012.01)
 *F16H 57/025* (2012.01)
 (Continued)

(52) U.S. Cl.
 CPC .............. *B62M 11/06* (2013.01); *B62M 7/04* (2013.01); *F16H 57/021* (2013.01); *F16H 57/025* (2013.01); *F16H 57/031* (2013.01); *F16H 2057/02034* (2013.01); *F16H 2057/02065* (2013.01)

(58) Field of Classification Search
 CPC ....... B62M 11/06; B62M 7/04; F16H 57/021; F16H 57/025; F16H 57/031; F16H 2057/02034; F16H 2057/02065
 See application file for complete search history.

(56) References Cited

U.S. PATENT DOCUMENTS 5,222,572 A * 6/1993 Yamagiwa ............... B62M 7/12
                                                     180/230
10,391,853 B2 * 8/2019 Takemoto .............. H02K 7/116
(Continued)

FOREIGN PATENT DOCUMENTS

FR       2987003 A1 *  8/2013 ............ B62M 11/06
JP    H07-274436 A    10/1995
(Continued)

OTHER PUBLICATIONS

European Patent Office, Extended European Search Report, Application No. 22181165.6-1009, dated Nov. 21, 2022, in 9 pages.

*Primary Examiner* — Zakaria Elahmadi
(74) *Attorney, Agent, or Firm* — Procopio, Cory, Hargreaves & Savitch LLP (57) ABSTRACT

A motor is to be mounted on a vehicle as a drive source. The motor includes a motor shaft extending in an axial direction, a drive gear provided on the motor shaft, a gear shaft extending in the axial direction, a driven gear provided on the gear shaft and coupled to the drive gear, a rotating member, an inner bearing that supports the gear shaft, and an outer bearing that supports the gear shaft. The rotating member is provided on the gear shaft and is configured to be coupled to a power transmission member that transmits power to a wheel of the vehicle. The rotating member is located between the inner bearing and the outer bearing in the axial direction.

27 Claims, 4 Drawing Sheets

(51) Int. Cl.
*F16H 57/031* (2012.01)
*F16H 57/02* (2012.01)

(56) References Cited

U.S. PATENT DOCUMENTS

| | | | | |
|---|---|---|---|---|
| 2002/0046891 | A1* | 4/2002 | Honda | H02K 29/08 |
| | | | | 180/220 |
| 2005/0229742 | A1* | 10/2005 | Komura | F16H 57/031 |
| | | | | 74/606 R |
| 2016/0290442 | A1* | 10/2016 | Adachi | F16H 63/18 |
| 2017/0113544 | A1* | 4/2017 | Tsujimoto | B60K 1/00 |
| 2017/0152943 | A1* | 6/2017 | Kume | F16H 57/02 |
| 2017/0350505 | A1* | 12/2017 | Hasegawa | B62M 11/06 |
| 2018/0031097 | A1* | 2/2018 | Matsuura | F16H 3/006 |
| 2018/0056774 | A1* | 3/2018 | Chan | B60K 17/145 |
| 2018/0094718 | A1* | 4/2018 | Kisaichi | F16H 57/02 |
| 2018/0171838 | A1* | 6/2018 | Maruyama | B60K 1/00 |
| 2018/0287455 | A1* | 10/2018 | Uematsu | H02K 5/225 |
| 2019/0002056 | A1* | 1/2019 | Zhu | H02K 7/006 |
| 2019/0207470 | A1* | 7/2019 | Uematsu | F16H 57/02 |
| 2019/0249765 | A1* | 8/2019 | Ito | B60K 1/00 |
| 2020/0217410 | A1* | 7/2020 | Yamaguchi | F16H 57/032 |
| 2021/0094413 | A1* | 4/2021 | Kim | B60K 17/046 |
| 2022/0032765 | A1* | 2/2022 | Kitamura | B62K 11/04 |

FOREIGN PATENT DOCUMENTS

| | | |
|---|---|---|
| WO | 2016-201705 A1 | 12/2016 |
| WO | 2020-213593 A1 | 10/2020 |

* cited by examiner

FRONT ← → REAR

GEARED MOTOR FOR VEHICLE

CROSS-REFERENCE TO RELATED APPLICATIONS

This application is based on and claims priority under 35 USC 119 from Japanese Patent Application No. 2021-113531 filed on Jul. 8, 2021, the contents of which are incorporated herein by reference.

TECHNICAL FIELD

The present disclosure relates to a geared motor to be mounted on a vehicle as a drive source.

BACKGROUND ART

JP-A-07-274436 discloses a geared motor in which a motor and a reduction gear are integrated. In the geared motor, a motor output shaft and a gear shaft protrude from a motor case, and the motor output shaft and the gear shaft shafts are coupled to each other through gears. Each gear is supported by bearings from both sides in an axial direction. A driven member is connected to an axially outer side of the gear shaft.

For example, when the geared motor is used as a drive source of a straddle type vehicle such as a motorcycle, a rotating member such as a sprocket is provided at an axially outer end portion of the gear shaft, and a power transmission member such as a chain is bridged between the rotating member and another rotating member provided on an axle of a rear wheel. In this case, since two bearings for the motor and the gear and a reduction gear are disposed between the power transmission member and a motor case, a distance between an outer end surface of the motor case and the power transmission member increases.

SUMMARY OF INVENTION

The present disclosure relates to a geared motor for a vehicle that can make a vehicle width size compact.

According to an aspect, a motor is to be mounted on a vehicle as a drive source of the vehicle. The motor includes a gear shaft, an inner bearing, a driven gear, a rotating member and an outer bearing. The gear shaft protrudes from a motor case in an axial direction which is a direction in which a motor shaft of the motor extends. An inner bearing is provided at an axially inner side of the gear shaft, that is, at a side of the gear shaft closest to the motor case. The driven gear is provided on the gear shaft at an axially outer side with respect to the inner bearing. The rotating member is provided at an axially outer side of the driven gear on the gear shaft and is configured to be coupled to a power transmission member that transmits power to a wheel of the vehicle. The outer bearing is provided on the gear shaft at an axially outer side with respect to the rotating member.

According to an aspect, a straddle type vehicle includes a motor serving as a drive source, a swing arm that supports a rear wheel so as to be swingable relative to a vehicle body frame about a pivot shaft, and a power transmission member that transmits power of the motor to the rear wheel. The motor includes a motor shaft and a gear shaft that extend in a vehicle width direction. The gear shaft is disposed closer to the pivot shaft with respect to the motor shaft.

According to an aspect, a motor is to be mounted on a vehicle as a drive source of the vehicle. The motor includes a motor shaft extending in an axial direction, a drive gear provided on the motor shaft, a gear shaft extending in the axial direction, a driven gear provided on the gear shaft and coupled to the drive gear, a rotating member provided on the gear shaft and configured to be coupled to a power transmission member that transmits power to a wheel of the vehicle, an inner bearing that supports the gear shaft, and an outer bearing that supports the gear shaft. The rotating member is located between the inner bearing and the outer bearing in the axial direction.

DESCRIPTION OF EMBODIMENTS

Figure 1:
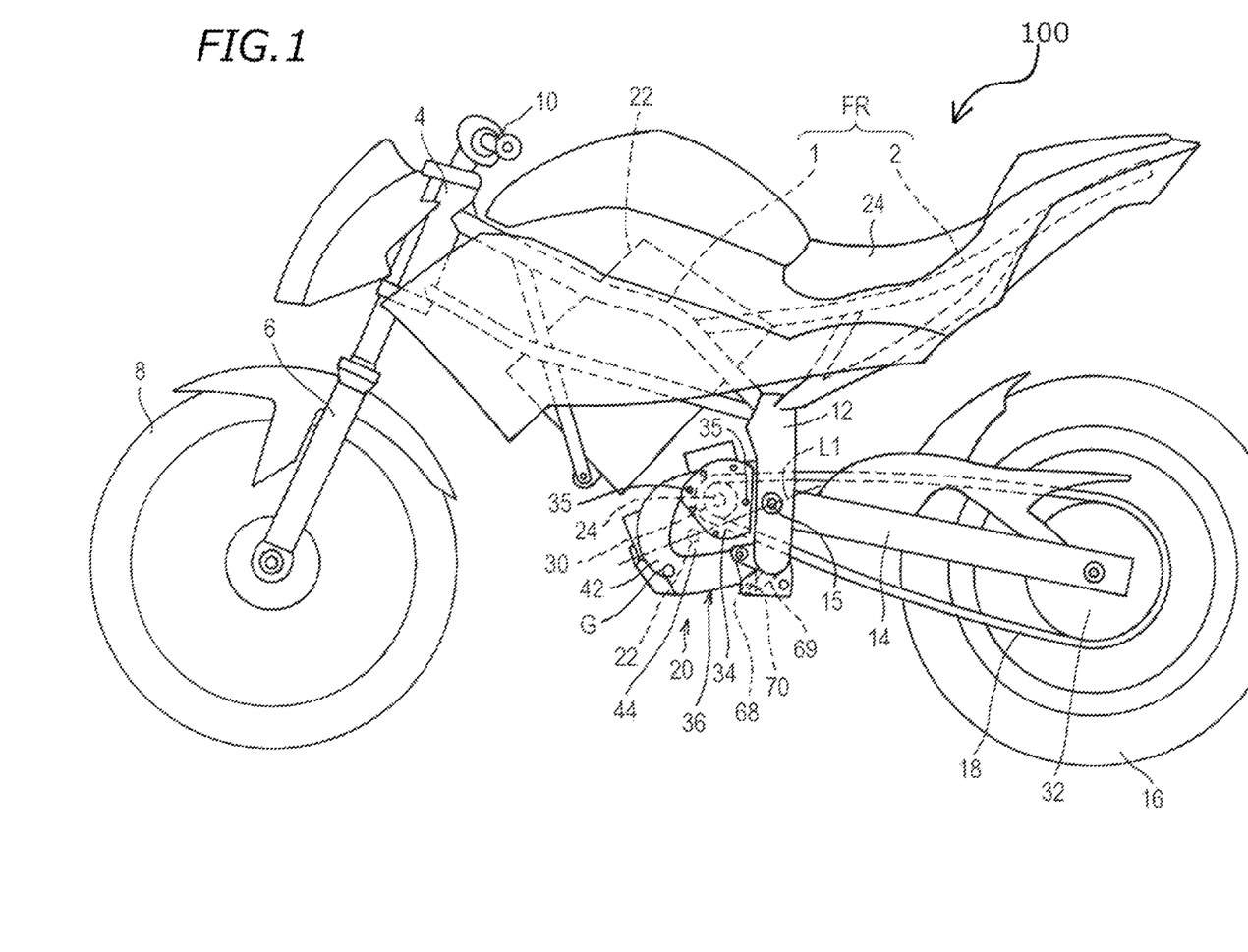
FIG. 1 is a side view showing a motorcycle which is a type of a vehicle provided with a motor.

Exemplary embodiments will be described with reference to the drawings. FIG. 1 is a side view showing a motorcycle which is a type of a vehicle provided with a device according to embodiments. In the following description, "front" and "rear" refer to front and rear relative to a traveling direction of the vehicle. In addition, "left" and "right" refer to "left" and "right" as viewed from a rider riding on the vehicle.

A vehicle body frame FR of the motorcycle 100 includes a main frame 1 constituting a front half portion and a rear frame 2 constituting a rear half portion. The main frame 1 extends rearward and obliquely downward from a head pipe 4 at a front end, and then curves downward and extends in an upper-lower direction. The rear frame 2 extends rearward from a rear portion of the main frame 1. A front fork 6 is supported by the head pipe 4. A front wheel 8 is supported by a lower end portion of the front fork 6, and a handle 10 is attached to an upper end portion of the front fork 6.

A pair of left and right swing arm brackets 12 are provided at a rear end portion of the main frame 1. A swing arm 14 is supported by the swing arm bracket 12 so as to be swingable about a pivot shaft 15 at the front end. A rear wheel 16 is attached to a rear end portion of the swing arm 14. That is, the swing arm 14 swingably supports the rear wheel 16 relative to the vehicle body frame FR.

A motor 20 that is a drive source is disposed below the main frame 1 and in front of the swing arm bracket 12. The motor 20 is supported by the vehicle body frame FR. Specifically, the motor 20 is fixed to the swing arm bracket 12. A support structure of the motor 20 will be described later. The power of the motor 20 is transmitted to the rear wheel 16 via a power transmission member 18, so that the rear wheel 16 is driven. That is, the rear wheel 16 is a drive wheel. Although a drive chain is used as the power transmission member 18 in the present embodiment, the power transmission member 18 is not limited thereto, and may be, for example, a timing belt or a drive shaft.

A battery 22 is disposed in front of and above the motor 20. The battery 22 is supported by the main frame 1. A seat 24 on which a rider sits is mounted on the rear frame 2.

Figure 2:
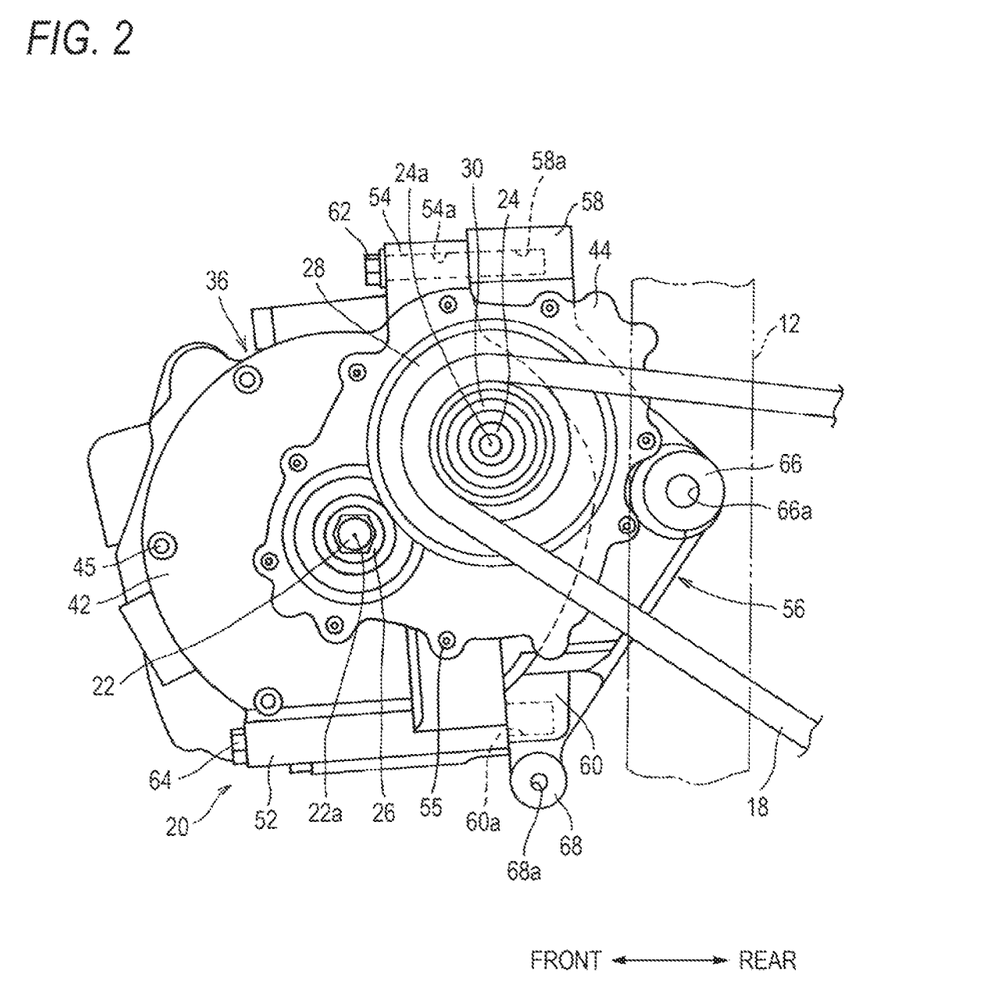
FIG. 2 is a side view showing the motor.

As shown in FIG. 2, the motor 20 according to the present embodiment is a geared motor including an output shaft 22 that is a motor shaft and a gear shaft 24 that is coupled to the output shaft 22 through gears. That is, the rotation of the output shaft 22 is decelerated and output from the gear shaft 24. Specifically, a drive gear 26 provided on the output shaft 22 and a driven gear 28 provided on the gear shaft 24 are coupled to each other, and the rotation speed of the output shaft 22 is decreased.

Further, the gear shaft 24 is provided with a rotating member 30 that is coupled to the power transmission member 18. A sprocket is used as the rotating member 30 in the present embodiment. As shown in FIG. 1, the power transmission member 18 is hung on the rotating member 30 and a wheel-side rotating member 32 provided on the rear wheel 16. As a result, the power of the motor 20 is transmitted to the drive wheel 16. The rotating bodies 30 and 32 are not limited to a sprocket, and may be, for example, a pulley.

The rotating member 30 is covered with a cover body 34 from the outside in a vehicle width direction. The cover body 34 according to the present embodiment is a chain cover 34 that covers the entire rotating member 30 and a front end portion of the power transmission member 18 from the outside in the vehicle width direction. The chain cover 34 is made of, for example, metal. The chain cover 34 prevents the rotating member 30 and the power transmission member 18 from coming into contact with external objects. The cover body 34 is not limited to the chain cover 34. The cover body 34 is detachably attached to the motor 20 in the present embodiment. More specifically, the cover body 34 is detachably attached to an outer side surface of the motor 20 by a plurality of bolts 35 (FIG. 1) that are arranged apart from one another in a circumferential direction. The bolts 35 are disposed in front of the gear shaft 24 and between an upper side and a lower side of the power transmission members 18. The cover body 34 is omitted in FIG. 2.

As shown in FIG. 1, the gear shaft 24 is disposed closer to the pivot shaft 15 than the motor shaft 22. Specifically, the gear shaft 24 is disposed above a straight line L1 that connects the pivot shaft 15 and the motor shaft 22 in a side view. That is, in the side view, the output shaft 22 is located at a lower front side of the gear shaft 24. An oil gauge G may be provided at a lower front side of the output shaft 22 in the side view. Accordingly, a gear region and an oil region of the motor 20 can be separated from each other.

Figure 3:
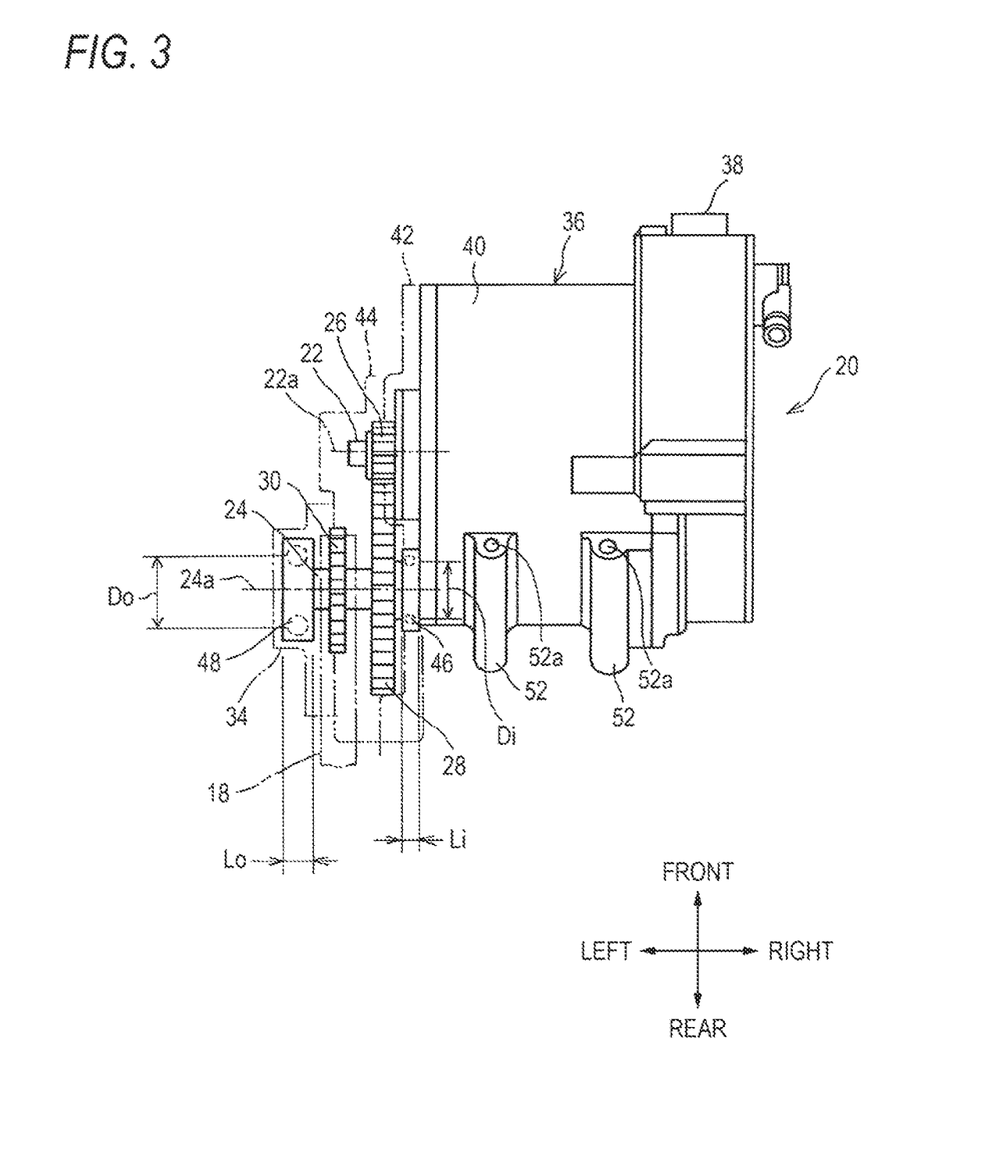
FIG. 3 is a perspective view showing the motor as viewed obliquely from below and from a front side.

As shown in FIG. 3, the motor 20 includes a motor case 36 that rotatably supports the output shaft 22 and the gear shaft 24. In the present embodiment, an axis 22a of the output shaft 22 and an axis 24a of the gear shaft 24 extend in the vehicle width direction (a left-right direction). The gear shaft 24 protrudes from the motor case 36 in a direction of the axis 22a of the output shaft 22, that is, in the vehicle width direction.

An input/output port 38 for inputting or outputting electric power of the motor 20 is disposed at a side of the motor case 36 opposite to the power transmission member 18. In the present embodiment, the power transmission member 18 is disposed at a left side of the motor case 36, and the input/output port 38 is provided in the vicinity of a right side portion of an upper portion of the motor case 36.

Figure 4:
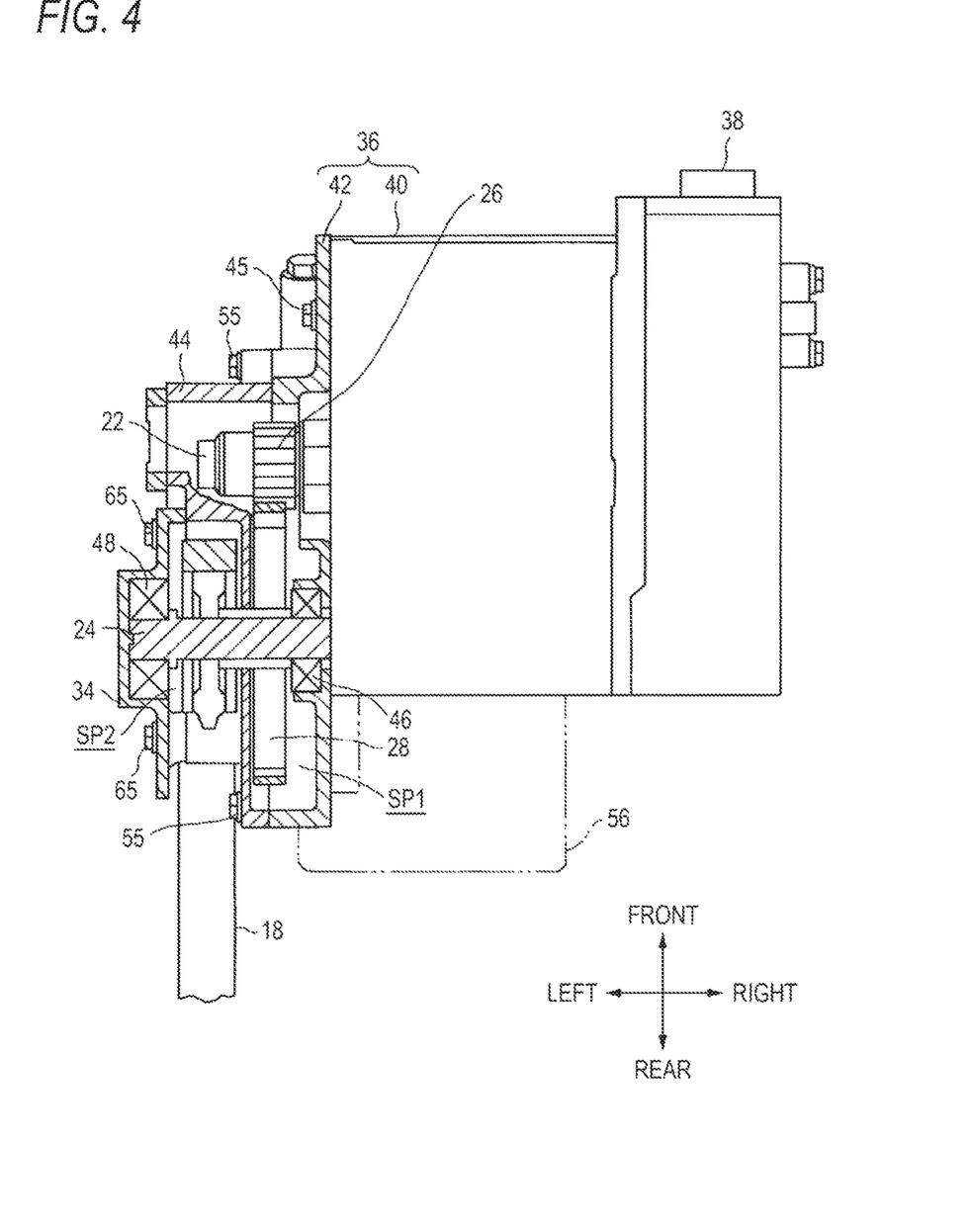
FIG. 4 is a cross-sectional view showing the motor.

As shown in FIG. 4, the motor case 36 includes a case body 40 and a case lid 42 that is detachably attached to the case body 40. The case body 40 has an opening on one side in an axial direction, that is, at a left side in the present embodiment, and the opening is closed by the case lid 42. The case lid 42 is fixed to the case body 40 by a plurality of bolts 45.

The motor case 36 further includes a gear case 44. The gear case 44 is fixed to the case lid 42 from the outside in the axial direction by a plurality of bolts 55. Accordingly, a gear space SP1 is formed between the case lid 42 and the gear case 44. The drive gear 26 and the driven gear 28 are disposed in the gear space SP1.

The cover body 34 is fixed to an outer end surface of the gear case 44 in the vehicle width direction. Specifically, the cover body 34 is detachably attached to the gear case 44 from the outside in the axial direction by a plurality of bolts 65. Accordingly, a rotating member space SP2 is formed between the cover body 34 and the gear case 44. The rotating member 30 is disposed in the rotating member space SP2. In FIG. 3, the cover body 34, the case lid body 42, and the gear case 44 are shown by two-dot chain lines.

An inner bearing 46 is provided at an axially inner side of the gear shaft 24 of the motor 20, that is, is provided at a side closest to the motor case 36. The driven gear 28 is provided at an axially outer side of the inner bearing 46 on the gear shaft 24. That is, the inner bearing 46 is provided between the motor case 36 and the driven gear 28.

The rotating member 30 is provided at an axially outer side of the driven gear 28 on the gear shaft 24. An outer bearing 48 is provided at an axially outer end of the gear shaft 24. The outer bearing 48 is provided at an axially outer side of the rotating member 30. The rotating member 30 that is coupled to the power transmission member 18 is provided between the inner bearing 46 and the outer bearing 48. That is, the gear shaft 24 is provided with the inner bearing 46, the driven gear 28, the rotating member 30, and the outer bearing 48 in this order from an inner side in the axial direction. The inner bearing 46 and the outer bearing 48 are, for example, rolling bearings.

A load bearing capacity of the outer bearing 48 is set to be larger than a load bearing capacity of the inner bearing 46. A large load from the rear wheel 16 is applied to the outer bearing 48 via the power transmission member 18, and the load can be supported by such a configuration. The outer bearing 48 is set to be larger than the inner bearing 46 in the present embodiment. Specifically, an axial dimension of the outer bearing 48 is set to be larger than an axial dimension of the inner bearing 46 (Li<Lo). The outer bearing 48 is set to have a larger rolling element pitch circle diameter than the inner bearing 46 (Di<Do). That is, the inner bearing 46 is set to be smaller than the outer bearing 48.

As shown in FIG. 4, the inner bearing 46 is supported by the case lid 42. That is, the case lid 42 supports the inner bearing 46 and constitutes an inner plate fixed to the case body 40. Specifically, a bearing housing space for housing the inner bearing 46 is formed in the motor case 36. The bearing housing space is formed by, for example, an annular protruding wall protruding from the motor case 36. The gear case 44 is fixed to the inner plate 42 from the outside in the axial direction, thereby forming an outer plate that forms the gear space SP1 between the inner plate 42 and the outer plate. The motor shaft 22 is also rotatably supported by the case lid body 42 (the inner plate) in the present embodiment.

The outer bearing 48 is supported by the cover body 34. That is, the cover body 34 constitutes a support member that supports the outer bearing 48, is fixed to the outer plate 44 from the outside in the axial direction, and forms the rotating member space SP2 between the outer plate 44 and the cover body 34. That is, a bearing housing space for housing the outer bearing 48 is formed in the cover body 34. The bearing housing space is formed by, for example, a recessed portion that is recessed outward from the cover body 34. Alternatively, the outer bearing 48 may be supported by a member other than the cover body 34, for example, may be supported by a chain guide that guides the power transmission member 18.

Next, a support structure of the motor 20 will be described. As shown in FIG. 3, a cylindrical lower boss portion 52 is formed on a lower surface of the case body 40 of the motor case 36. FIG. 3 is a perspective view showing the motor 20 as viewed obliquely from below and from a front side. In the present embodiment, two lower boss portions 52 are provided side by side in the axial direction of the motor 20, that is, in the vehicle width direction. The number of the lower boss portions 52 is not limited thereto. In this manner, the lower boss portion 52 which is a portion of the motor 20 coupled to the vehicle body is located axially inward of the gear space SP1 which is a gear housing portion.

As shown in FIG. 2, a cylindrical upper boss portion 54 is formed on an upper surface of the motor case 36. In the present embodiment, two upper boss portions 54 are arranged side by side in the axial direction of the motor 20. The number of the upper boss portions 54 is not limited thereto.

The motor 20 is fixed to the swing arm bracket 12 via a motor bracket 56. The motor bracket 56 according to the present embodiment has a shape elongated in the upper-lower direction in a side view. An upper attachment portion 58 is formed at a position corresponding to the upper boss portion 54 at an upper end of the motor bracket 56. On the other hand, a lower attachment portion 60 is formed at a position corresponding to the lower boss portion 52 at a lower end of the motor bracket 56. The upper attachment portion 58 and the lower attachment portion 60 have, for example, a bottomed cylindrical shape in which screw holes 58a and 60a are formed.

A fastening member 62 such as a bolt is inserted into a hollow hole 54a of the upper boss portion 54 of the motor 20 from a front side of the vehicle body, and is fastened to the screw hole 58a of the upper attachment portion 58 of the motor bracket 56. Similarly, a fastening member 64 such as a bolt is inserted into a hollow hole 52a (FIG. 3) of the lower boss portion 52 of the motor 20 from the front side of the vehicle body, and is fastened to the screw hole 60a of the lower attachment portion 60 of the motor bracket 56. In this manner, the motor 20 and the motor bracket 56 are integrally coupled to each other.

A first supported portion 66 is formed at an intermediate portion of the motor bracket 56 in the upper-lower direction. The first supported portion 66 includes a cylindrical portion having an insertion hole 66a extending in the vehicle width direction. A second supported portion 68 is formed at a lower end portion of the motor bracket 56. The second supported portion 68 has an insertion hole 68a that protrudes downward from a lower end portion of the motor bracket 56 and extends in the vehicle width direction.

In a state in which the motor bracket 56 is disposed between the left and right swing arm brackets 12, the pivot shaft 15 shown in FIG. 1 is fitted into the insertion hole 66a of the first supported portion 66. Accordingly, the first supported portion 66 of the motor bracket 56 is supported by the swing arm brackets 12.

The second supported portion 68 at the lower portion of the motor bracket 56 is bolted to the swing arm bracket 12. In the present embodiment, the second supported portion 68 is coupled to the swing arm bracket 12 via a stay 69. Specifically, a bolt 70 is inserted into the insertion hole 68a (FIG. 2) of the second supported portion 68 from the outside in the vehicle width direction, and is fastened to a screw hole provided in the stay 69. The screw hole is, for example, a welded nut. The stay 69 is joined by welding to, for example, a cross member that couples the left and right swing arm brackets 12. In this manner, the motor 20 is supported by the swing arm brackets 12 via the motor bracket 56.

According to the above configuration, since the inner bearing 46 and the driven gear 28 are disposed between the power transmission member 18 and the motor case 36 as shown in FIG. 3, a distance between an outer end surface of the motor case 36 and the power transmission member 18 is reduced as compared with a case where two bearings and a driven gear are provided. As a result, an axial dimension of the motor 20 can be reduced. In addition, since the rotating member 30 coupled to the power transmission member 18 is supported at both ends by the inner and outer bearings 46 and 48, the outer bearing 48 can be reduced in size as compared with a case where the rotating member 30 is supported at one end by the outer bearing.

The outer bearing 48 is set to be larger than the inner bearing 46. A large radial load from the rear wheel 16 is applied to the outer bearing 48 via the power transmission member 18. According to the above configuration, it is possible to stably support such a large radial load.

The outer bearing 48 is supported by the cover body 34. Accordingly, it is not necessary to provide a separate member for supporting the outer bearing 48, and it is possible to prevent an increase in the number of components.

The cover body 34 is attached to the motor case 36. Accordingly, it is easy to eliminate an attachment error as compared with a case where the cover body is attached to the vehicle body frame FR (FIG. 1). In addition, an assembly including the motor 20 and the cover body 34 is formed, and it is easy to attach the assembly to the vehicle body.

As shown in FIG. 4, the inner bearing 46 is rotatably supported by the case lid 42, and the case lid 42 is detachably attached to the motor case 36. The gear case 44 is detachably attached to the case lid 42 to form the gear space SP1. Further, the outer bearing 48 is rotatably supported by the cover body 34, and the cover body 34 is detachably attached to the gear case 44. Accordingly, it is easy to couple and inspect the rotating member 30 and the power transmission member 18 by removing the cover body 34. In addition, both ends of the rotating member 30 can be supported by supporting the outer bearing 48 on the cover body 34.

As shown in FIG. 1, the gear shaft 24 is disposed closer to the pivot shaft 15 than the motor shaft 22. Accordingly, the motor shaft 22 is separated from the pivot shaft 15 to improve mountability of other components around the pivot shaft 15, and the pivot shaft 15 and the gear shaft 24 are brought close to each other, so that an influence of a relative displacement of the power transmission member 18 on the swing arm 14 can be prevented.

The motor 20 is fixed to the swing arm bracket 12. Accordingly, since both the motor 20 and the swing arm 14 are supported by the swing arm brackets 12, it is possible to prevent a positional deviation between the gear shaft 24 and the pivot shaft 15 of the swing arm 14.

As shown in FIG. 3, the boss portion 52 which is a portion of the motor 20 coupled to the swing arm bracket 12 is located axially inward of the gear space SP1 which is a gear housing portion. As a result, an interference between the gear space SP1 and the boss portion 52 can be prevented.

The present invention is not limited to the embodiments described above, and various additions, changes, and deletions can be made without departing from the gist of the present invention. For example, although an example in which the geared motor according to the present invention is applied to a motorcycle has been described in the above embodiment, the geared motor according to the present invention can also be applied to a straddle type vehicle other than a motorcycle, for example, the geared motor can be applied to a three-wheeled vehicle, a four-wheeled buggy, and the like. Therefore, such examples are also included in the scope of the present invention.

In accordance with embodiments, as shown in FIGS. 1 to 4, a motor 20 is configured to be mounted on a vehicle 100 as a drive source of the vehicle 100. The motor 20 includes a gear shaft 24 that protrudes from a motor case 36 in an axial direction which is a direction in which a motor shaft 22 of the motor 20 extends, an inner bearing 46 that is provided at an axially inner side of the gear shaft 24, that is, at a side of the gear shaft 24 closest to the motor case 36, a driven gear 28 that is provided on the gear shaft 24 at an axially outer side with respect to the inner bearing 46, a rotating member 30 that is provided at an axially outer side of the driven gear 28 on the gear shaft 24 and is configured to be coupled to a power transmission member 18 that transmits power to a wheel 16 of the vehicle 100, and an outer bearing 48 that is provided on the gear shaft 24 at an axially outer side with respect to the rotating member 30.

The inner bearing 46 is smaller than the outer bearing 48.

The motor 20 further includes a cover body 34 that covers the rotating member 30 from an outside in the axial direction. The outer bearing 48 is supported by the cover body 34. The cover body 34 is attached to the motor case 36.

The motor 20 further includes an inner plate 42 that supports the inner bearing 46 and is fixed to the motor case 36, an outer plate 44 that is fixed to the inner plate 42 from an axially outer side to form a gear space SP1 between the inner plate 42 and the outer plate 44, and a support member 34 that supports the outer bearing 48 and is fixed to the outer plate 44 from an axially outer side to form a rotating member space SP2 between the support member 34 and the outer plate 44.

According to this configuration, it is easy to couple the rotating member and the power transmission member by removing the support member. Both ends of the gear shaft can be supported by attaching the support member. In this manner, it is easy to couple the rotating member and the power transmission member, and support rigidity of the gear shaft can be improved.

In accordance with embodiments, as shown in FIGS. 1 to 4, a straddle type vehicle 100 includes a motor 20, a swing arm 14 that supports the wheel 16 so as to be swingable relative to a vehicle body frame FR about a pivot shaft 15, and the power transmission member 18 that transmits power of the motor 20 to the wheel 16. The motor 20 includes the motor shaft 22 and the gear shaft 24 that extend in a vehicle width direction. The gear shaft 24 is disposed closer to the pivot shaft 15 with respect to the motor shaft 22.

The gear shaft 24 is disposed above a straight line that connects the pivot shaft 18 and the motor shaft 22 in a side view.

The vehicle body frame FR is provided with a swing arm bracket 12 that supports the swing arm 14. The motor 20 is fixed to the swing arm bracket 12.

The motor 20 includes a drive gear 26 provided on the motor shaft 22, the driven gear 28 provided on the gear shaft 24, and a gear housing portion SP1 that houses the drive gear 26 and the driven gear 28. A portion of the motor 20 coupled to the swing arm bracket 12 is located axially inward of the gear housing portion SP1.

In accordance with embodiments, as shown in FIGS. 1 to 4, a straddle type vehicle 100 includes a motor 20 serving as a drive source, a swing arm 14 that supports a rear wheel 16 so as to be swingable relative to a vehicle body frame FR about a pivot shaft 15, and a power transmission member 18 that transmits power of the motor 20 to the rear wheel 16. The motor 20 includes a motor shaft 22 and a gear shaft 24 that extend in a vehicle width direction. The gear shaft 24 is disposed closer to the pivot shaft 15 with respect to the motor shaft 22.

In accordance with embodiments, as shown in FIGS. 1 to 4, a motor 20 is configured to be mounted on a vehicle 100 as a drive source of the vehicle 100. The motor 20 includes a motor shaft 22 extending in an axial direction, a drive gear 26 provided on the motor shaft 22, a gear shaft 24 extending in the axial direction, a driven gear 28 provided on the gear shaft 24 and coupled to the drive gear 26, a rotating member 30 provided on the gear shaft 24 and configured to be coupled to a power transmission member 18 that transmits power to a wheel 16 of the vehicle 100, an inner bearing 46 that supports the gear shaft 24, and an outer bearing 48 that supports the gear shaft 24. The rotating member 30 is located between the inner bearing 46 and the outer bearing 48 in the axial direction.

The driven gear 28 is located between the inner bearing 46 and the outer bearing 48 in the axial direction. The rotating member 30 is located between the driven gear 28 and the outer bearing 48 in the axial direction.

What is claimed is:

1. A motor to be mounted on a vehicle as a drive source of the vehicle, the motor comprising:
   a gear shaft that protrudes from a motor case in an axial direction which is a direction in which a motor shaft of the motor extends, the motor case including a gear case and a case body;
   an inner bearing that is provided at an axially inner side of the gear shaft, that is, at a side of the gear shaft closest to the motor case;
   a driven gear that is provided on the gear shaft at an axially outer side with respect to the inner bearing;
   a rotating member that is provided at an axially outer side of the driven gear on the gear shaft and is configured to be coupled to a power transmission member that transmits power to a wheel of the vehicle;
   an outer bearing that is provided on the gear shaft at an axially outer side with respect to the rotating member, wherein the gear case is disposed on an outside of the case body in the axial direction with respect to the driven gear and covering the driven gear from the outside; and
   a support member disposed on the outside in the axial direction with respect to the rotating member and covering the rotating member from the outside,
   wherein the rotating member is bridged to another rotating member provided on an axle of a rear wheel of the vehicle via the power transmission member, and
   wherein the rotating member is disposed outside a space defined by the gear case.

2. The motor according to claim 1, wherein the inner bearing is smaller than the outer bearing.

3. The motor according to claim 1, further comprising:
   a cover body that covers the rotating member from an outside in the axial direction,
   wherein the outer bearing is supported by the cover body.

4. The motor according to claim 3, wherein the cover body is attached to the motor case.

5. The motor according to claim 1, further comprising:
   an inner plate that supports the inner bearing and is fixed to the motor case;
   an outer plate that is fixed to the inner plate from an axially outer side to form a gear space between the inner plate and the outer plate; and a support member that supports the outer bearing and is fixed to the outer plate from an axially outer side to form a rotating member space between the support member and the outer plate.

6. A straddle type vehicle comprising:
the motor according to claim 1;
a swing arm that supports the wheel so as to be swingable relative to a vehicle body frame about a pivot shaft; and
the power transmission member that transmits power of the motor to the wheel,
wherein the motor includes the motor shaft and the gear shaft that extend in a vehicle width direction, and
wherein the gear shaft is disposed closer to the pivot shaft with respect to the motor shaft.

7. The straddle type vehicle according to claim 6, wherein the gear shaft is disposed above a straight line that connects the pivot shaft and the motor shaft in a side view.

8. The straddle type vehicle according to claim 6, wherein the vehicle body frame is provided with a swing arm bracket that supports the swing arm, and
wherein the motor is fixed to the swing arm bracket.

9. The straddle type vehicle according to claim 8, wherein the motor includes:
a drive gear provided on the motor shaft;
the driven gear provided on the gear shaft; and
a gear housing portion that houses the drive gear and the driven gear, and
wherein a portion of the motor coupled to the swing arm bracket is located axially inward of the gear housing portion.

10. A straddle type vehicle comprising:
the motor serving as a drive source according to claim 1;
a swing arm that supports a rear wheel so as to be swingable relative to a vehicle body frame about a pivot shaft; and
a power transmission member that transmits power of the motor to the rear wheel,
wherein the motor includes a motor shaft and a gear shaft that extend in a vehicle width direction, and
wherein the gear shaft is disposed closer to the pivot shaft with respect to the motor shaft.

11. A motor to be mounted on a vehicle as a drive source of the vehicle, the motor comprising:
a motor shaft extending in an axial direction;
a drive gear provided on the motor shaft;
a gear shaft extending in the axial direction;
a driven gear provided on the gear shaft and coupled to the drive gear;
a motor case disposed on the gear shaft and the motor shaft, the motor case including a gear case and a case body;
a rotating member provided on the gear shaft and configured to be coupled to a power transmission member that transmits power to a wheel of the vehicle;
an inner bearing that supports the gear shaft;
an outer bearing that supports the gear shaft,
wherein the gear case is disposed on an outside of the case body in the axial direction with respect to the driven gear and covering the driven gear from the outside; and
a support member disposed on the outside in the axial direction with respect to the rotating member and covering the rotating member from the outside,
wherein the rotating member is located between the inner bearing and the outer bearing in the axial direction,
wherein the rotating member is bridged to another rotating member provided on an axle of a rear wheel of the vehicle via the power transmission member, and
wherein the rotating member is disposed outside a space defined by the gear case.

12. The motor according to claim 11, wherein the driven gear is located between the inner bearing and the outer bearing in the axial direction, and
wherein the rotating member is located between the driven gear and the outer bearing in the axial direction.

13. The motor according to claim 1, wherein, in the direction that the gear shaft protrudes from the motor case, the inner bearing, the driven gear, the rotating member, and the outer bearing are consecutively disposed around the gear shaft.

14. The motor according to claim 11,
wherein, in a direction that the gear shaft protrudes from the motor case, the inner bearing, the driven gear, the rotating member, and the outer bearing are consecutively disposed around the gear shaft.

15. The straddle type vehicle according to claim 10, wherein, in a side view of the vehicle, the power transmission member is disposed outside of the motor shaft.

16. The motor according to claim 1, wherein the rotating member is a sprocket or a pulley.

17. The motor according to claim 1, wherein the gear shaft protrudes from the motor case in the axial direction of the motor shaft.

18. The motor according to claim 3, wherein the cover body has a shape in which a lower side of the cover body opens.

19. The motor according to claim 3, wherein the cover body is attached detachably to the motor.

20. The motor according to claim 1, wherein the power transmission member is a chain or a timing belt.

21. The motor according to claim 1, wherein the motor shaft, the gear shaft, and an axle of the vehicle are disposed to shift from each other in a front-rear direction of the vehicle.

22. The motor according to claim 1, wherein the gear case defines gear space in which then driven gear is received, and
wherein the case body has a connection point via which the case body is fixed to the vehicle body.

23. The motor according to claim 1, wherein the inner bearing is smaller than the outer bearing in the axial direction.

24. The motor according to claim 1, wherein the gear shaft is arranged on a rear side with respect to the motor shaft, and
wherein the rotating member is bridged to said another rotating member provided on the axle of the rear wheel of the vehicle via the power transmission member on a rear side with respect to the gear shaft.

25. The motor according to claim 1, wherein the rotating member is arranged between the outer bearing and the inner bearing and is smaller than the inner bearing.

26. The motor according to claim 1, wherein the motor shaft of the motor is solid, and
wherein the motor shaft has a different axis from a rotational axis of the another rotating member.

27. The motor according to claim 1, further comprising:
an inner plate that supports the inner bearing and is fixed to the motor case;
an outer plate that is fixed to the inner plate from an axially outer side to form a gear space between the inner plate and the outer plate; and
a support member that supports the outer bearing and is fixed to the outer plate from an axially outer side to form a rotating member space between the support member and the outer plate.

\* \* \* \* \*